(12) United States Patent
Kok

(10) Patent No.: US 7,657,744 B2
(45) Date of Patent: Feb. 2, 2010

(54) SYSTEM AND METHOD FOR DYNAMICALLY DETERMINING THE ROLE OF A NETWORK DEVICE IN A LINK AUTHENTICATION PROTOCOL EXCHANGE

(75) Inventor: Wilson Kok, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 811 days.

(21) Appl. No.: 10/915,083

(22) Filed: Aug. 10, 2004

(65) Prior Publication Data

US 2006/0036856 A1    Feb. 16, 2006

(51) Int. Cl.
H04L 9/00    (2006.01)

(52) U.S. Cl. .................................. 713/168; 713/155

(58) Field of Classification Search .............. 713/155, 713/168, 169, 170, 153
See application file for complete search history.

(56) References Cited

U.S. PATENT DOCUMENTS

| | | | | |
|---|---|---|---|---|
| 7,181,530 | B1* | 2/2007 | Halasz et al. | 709/238 |
| 7,215,923 | B2* | 5/2007 | Hillyard | 455/41.1 |
| 2003/0084287 | A1* | 5/2003 | Wang et al. | 713/168 |
| 2003/0152067 | A1 | 8/2003 | Richmond et al. | 370/352 |
| 2003/0163692 | A1 | 8/2003 | Kleinsteiber et al. | 713/169 |
| 2005/0050004 | A1* | 3/2005 | Sheu et al. | 707/1 |
| 2006/0075089 | A1* | 4/2006 | Alam et al. | 709/224 |
| 2006/0193341 | A1* | 8/2006 | Sasaki et al. | 370/465 |

FOREIGN PATENT DOCUMENTS

| | | |
|---|---|---|
| EP | 1 484 889 A2 | 8/2004 |
| WO | WO 03/088547 A2 | 10/2003 |

OTHER PUBLICATIONS

Linux Network Administrator's Guide, 2nd Edition Olaf Kirch and Terry Dawson, Mar. 2000 O'Reilly and Associates, Chapter 5, pp. 1-6.*
Aboba, B., et al., *Extensible Authentication Protocol (EAP)*, Network Working Group, IETF Standard, Internet Engineering Task Force, Jun. 2004, pp. 67.
Ji, Lusheng, et al., *Self-Organizing Security Scheme for Multi-hop Wireless Access Networks*, 2004 IEEE Aerospace Conference Proceedings, Mar. 6, 2004, pp. 1231-1240.
*IEEE Std 802.1X-2001: Port-Based Access Control*; IEEE Standard for Local and Metropolitan Area Networks; Published Jul. 13, 2001; 142 pages.

* cited by examiner

*Primary Examiner*—Eleni A Shiferaw
(74) *Attorney, Agent, or Firm*—Campbell Stephenson LLP; Brenna A. Brock

(57) ABSTRACT

Various methods and systems for dynamically determining the role of a network device in a link authentication protocol exchange are disclosed. In one embodiment, such a method involves monitoring several (e.g., two) link authentication protocol exchanges. These link authentication protocol exchanges can be initiated at substantially the same time. A first network device acts as an authenticator in a first one of the link authentication protocol exchanges and a supplicant in a second one of the link authentication protocol exchanges. One of the link authentication protocol exchanges is terminated prior to completion.

31 Claims, 6 Drawing Sheets

SYSTEM AND METHOD FOR DYNAMICALLY DETERMINING THE ROLE OF A NETWORK DEVICE IN A LINK AUTHENTICATION PROTOCOL EXCHANGE

FIELD OF THE INVENTION

This invention relates to networking and, more particularly, to the authentication of links within a network.

BACKGROUND

Link authentication protocols are used to provide network devices with authenticated access to a network. In particular, link authentication protocols are used to authenticate each port coupled to a particular link. If a link authentication protocol exchange fails, a port connected to the link that was being authenticated by the exchange can be disabled from communicating via the link.

IEEE 802.1X defines a protocol for authenticating an Ethernet link. In the IEEE 802.1X model, two network devices communicate via the link being authenticated. When the link is brought up, one of the two network devices acts as an authenticator device while the other one of the two network devices acts as a supplicant device. The behavior of the authenticator device and the supplicant device is defined by IEEE 802.1X. In particular, the authenticator device communicates with an authentication server in order to authenticate the link to supplicant device. In situations in which the authenticator device and the authentication server are not co-located, the authenticator device needs to have layer 3 connectivity with the authentication server in order to be able to complete the IEEE 802.1X protocol exchange.

When a host device (e.g., a personal computer) connects to a network, the host device will act as a supplicant device. The nature of the host device's role is clear (i.e., the host device cannot act as an authenticator, since the host device is seeking admission into a network and does not have layer 3 connectivity with the authentication server until after the host device has been authenticated and authorized). Likewise, the network device at the edge of the network to which the host device is being connected will necessarily act as the authenticator device (since the network device at the edge of the network is providing the admission control and already has layer 3 connectivity to the authentication server). Thus, in many situations, the role (authenticator or supplicant) of a network device in an 802.1X exchange is unambiguous.

In certain situations, however, the role of each device is not immediately apparent. For example, IEEE 802.1X protocol exchanges can be used among the network nodes that make up the network. In such a situation, either or both of the devices involved in a given protocol exchange may potentially have layer 3 connectivity with the authentication server and may provide admission control to the other device; however, the device that has connectivity with the server may not necessarily be the device that is designated as the authenticator in the protocol exchange. Thus, in some circumstances, the ability of a given network device to gain connectivity with an authentication server may depend on that network device successfully completing an 802.1X protocol exchange with another network device. At the same time, if the network device has been designated as the authenticator for the 802.1X protocol exchange, the ability of the network device to complete the 802.1X protocol exchange with another device will depend upon the network device having connectivity with the authentication server. If a network device is designated as the authenticator for a protocol exchange, but that network device does not actually have connectivity with the authentication server, deadlock situations may arise.

A network can be designed to enforce authenticated access pervasively, for all network devices on all links. Ideally, when such a network is brought up, successful authentication (and as a result, connectivity with an authentication server) will start from the devices closest (i.e., separated by the fewest number of links) to an authentication server and propagate outwards. Links to supplicant devices closest to the authentication server will be authenticated, allowing the supplicant devices to subsequently act as authenticator devices. The new authenticator devices are then able to authenticate other devices that are further (in links) from the authentication server.

The role (authenticator or supplicant) of each device can be manually configured for each of the links in the network. However, it is difficult to manage manual configuration of the role. Additionally, conditions such as link flaps and network partitioning can easily change the relative 'distance' (in links) of a device from a server, potentially causing a device, which has been manually designated as an authenticator, to no longer have connectivity to an authentication server, even if one or more links coupled to the device have previously been authenticated. Deadlock situations may arise if a device that has not yet been admitted into the network (e.g., because the device has not yet completed a successful link authentication protocol exchange) tries to be an authenticator device while the device that already has connectivity with the authentication server is forced to be a supplicant. Therefore, a dynamic role determination mechanism for use with link authentication protocol exchanges is needed.

SUMMARY

Various embodiments of methods and systems for dynamically determining the role of a network device in a link authentication protocol exchange are disclosed. In one embodiment, such a method involves monitoring several (e.g., two) link authentication protocol exchanges. A first network device acts as an authenticator in a first one of the link authentication protocol exchanges and a supplicant in a second one of the link authentication protocol exchanges. One of the link authentication protocol exchanges is terminated prior to completion. Terminating the link authentication protocol exchange involves terminating participation of the first network device in the link authentication protocol exchange. The link authentication protocol exchanges can be IEEE 802.1X protocol exchanges.

The link authentication protocol exchanges that are monitored can be initiated at substantially the same time. Prior to initiation of the link authentication protocol exchanges, it may be indeterminate whether the first network device should be the authenticator or the supplicant.

The method can involve detecting whether the first network device has connectivity with an authentication server. For example, if receipt of a non-ID request from a second network device by the first network device is detected, it can be determined that the second network device, not the first network device, has connectivity with the authentication server. In response, the first link authentication protocol exchange, in which the first network device is acting as an authenticator, can be terminated. If instead receipt of a message from the authentication server by the first network device is detected, it can be determined that the first network device, not the second network device, has connectivity with the authentication server. In response, the second link authentication protocol exchange, in which the first network device is acting as a supplicant, can be terminated.

If it is detected that both the first network device and the second network device have connectivity with the authentication server, a tiebreaker function can be performed. The tiebreaker function selects one of the link authentication protocol exchanges for termination.

In one embodiment, a network device includes an authenticator module for a link authentication protocol, a supplicant module for the link authentication protocol, and a role determination module coupled to the authenticator module and the supplicant module. The role determination module can be configured to monitor the authenticator module and the supplicant module and to terminate operation of either the authenticator module or the supplicant module, prior to completion of a link authentication exchange being participated in by the module whose operation is being terminated. A system can include one or more of such network devices.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1A:
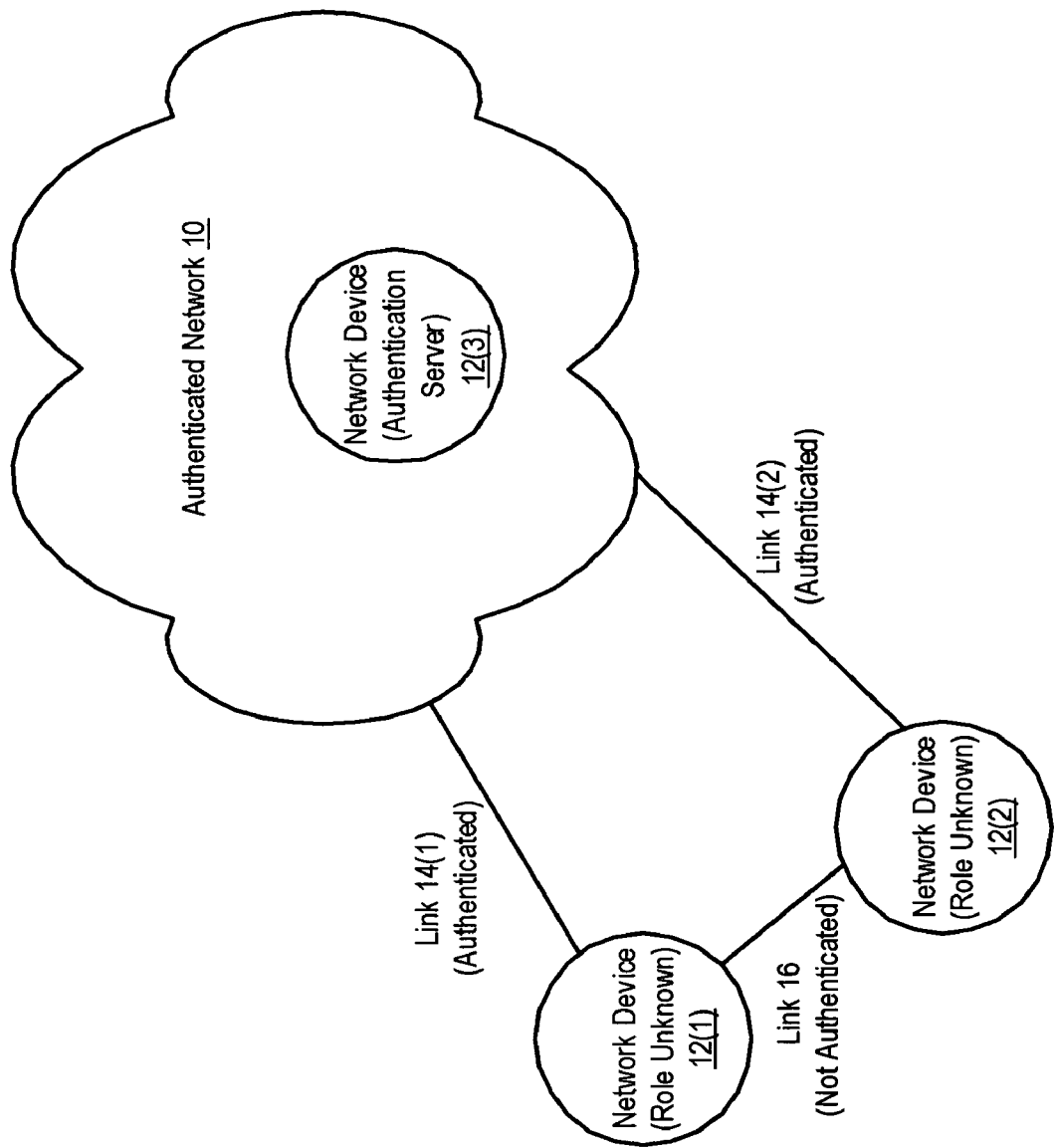
FIG. 1A is a block diagram of a network that includes two network devices that are conducting a link authentication protocol exchange, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A network device can dynamically determine the role of the network device in a link authentication protocol exchange conducted with a peer network device. Initially, the network device participates in two link authentication protocol exchanges, acting as an authenticator in one of the exchanges and as a supplicant in the other exchange. In response to monitoring both link authentication protocol exchanges, the network device selects one of the link authentication protocol exchanges and terminates that link authentication protocol exchange prior to completion. The non-selected link authentication protocol exchange continues to completion.

FIG. 1A is a block diagram of a network. A portion of the network has already been authenticated. This portion of the network is shown as authenticated network 10. The links within authenticated network 10 have already been authenticated according to a link authentication protocol. A link is considered to be authenticated when both interfaces (e.g., ports) coupled to each endpoint of that link are authenticated via a link authentication protocol exchange.

As shown, network 10 includes three network devices 12(1)-12(3). Network device 12(3) is located within authenticated network 10 (i.e., in this example, all of the links coupled to network device 12(2) have already been authenticated). Network devices 12(1) and 12(2) are coupled to authenticated network 10 by respective links 14(1) and 14(2). Network devices 12(1) and 12(2) are coupled by link 16. It is noted that other embodiments can include different numbers of network devices than are shown in this example.

Network devices 12(1)-12(3) can each be one of various types of network devices, including routers, bridges, gateways, switches, and the like. In this example, network device 12(3) is an authentication server for a link authentication protocol (e.g., an Extensible Authentication Protocol (EAP) such as IEEE 802.1X) used by network devices 12(1)-12(3).

Links 14(1) and 14(2) can be logical or physical links. For example, in one embodiment, link 14(1) is implemented as an Ethernet link while link 14(2) is implemented as a logical tunnel. As shown in FIG. 1A, links 14(1) and 14(2) have both been authenticated according to the link authentication protocol.

Link 16 can also be a logical link (e.g., a logical tunnel) or a physical link. One endpoint of link 16 is coupled to an interface in network device 12(1), while the other endpoint of link 16 is coupled to an interface in network device 12(2). Link 16 has not yet been authenticated by the link authentication protocol. Network devices 12(1) and 12(2) will conduct a link authentication protocol exchange in order to authenticate link 16. Before the link authentication protocol exchange initiates, the roles of network devices 12(1) and 12(2) in the link authentication protocol exchange are indeterminate. In other words, neither network device 12(1) nor network device 12(2) has a preconfigured role with respect to a link authentication protocol exchange over link 16.

Figure 1B:
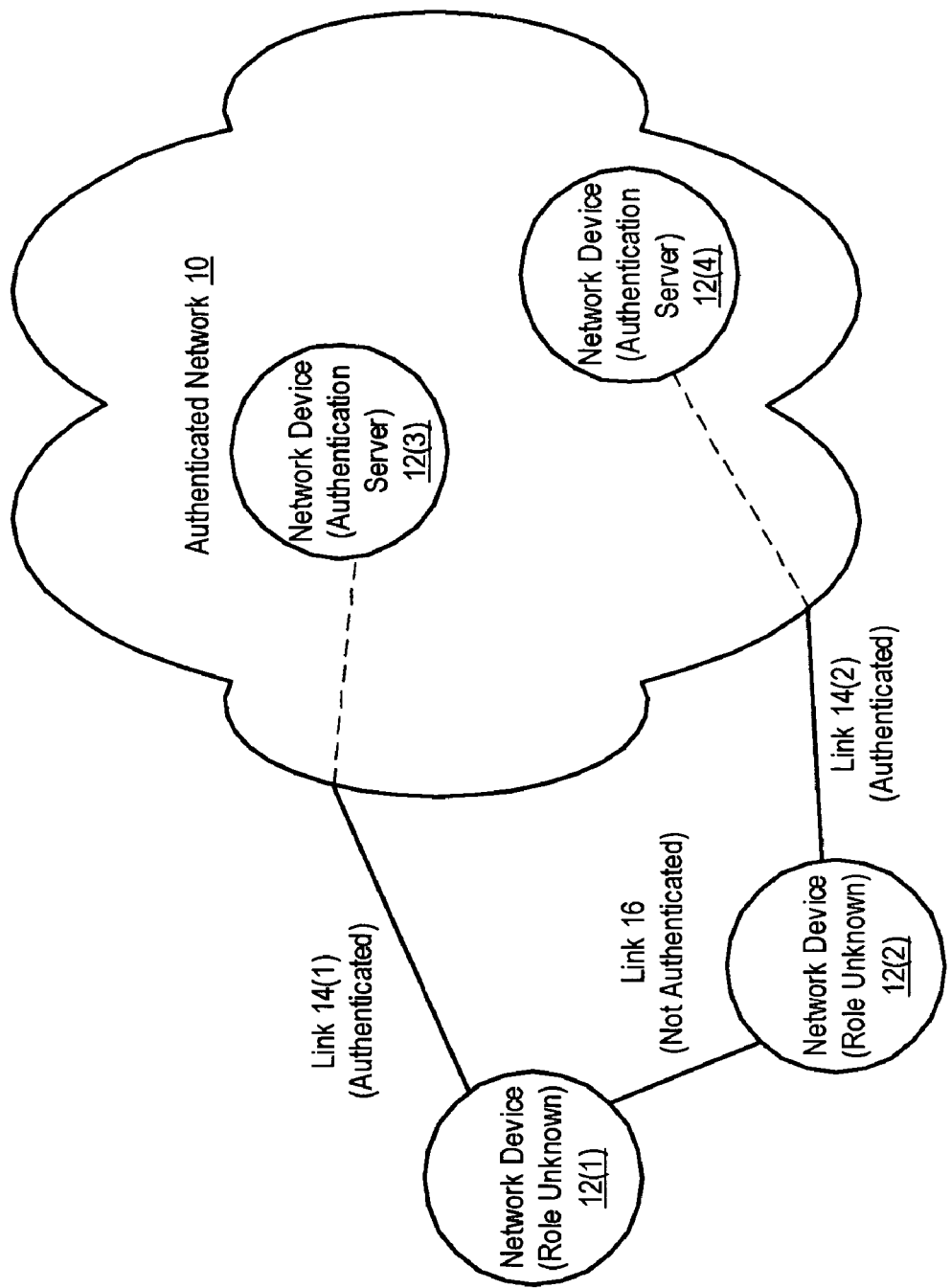
FIG. 1B is a block diagram of another network that includes two network devices that are conducting a link authentication protocol exchange, according to another embodiment of the present invention.

FIG. 1B shows another configuration of the network elements shown in FIG. 1A to illustrate another situation in which the invention can be implemented. In this example, unauthenticated link 16 again couples two network devices 12(1) and 12(2). Authenticated network 10 includes two network devices 12(3) and 12(4), which can each act as an authentication server. Network device 12(1) is coupled to authenticated network 10 by authenticated link 14(1). Network device 12(2) is coupled to authenticated network 10 by authenticated link 14(2). As shown by the dashed lines in FIG. 1B, network device 12(1) is potentially able to connect with network device 12(3), and network device 12(2) is potentially able to connect with network device 12(4). Thus, each of network devices 12(1) and 12(2) can potentially connect to a respective authentication server. Before network devices 12(1) and 12(2) attempt to initiate authentication of link 16, the respective role (authenticator or supplicant) of each network device may not be known by one or both of network devices 12(1) and 12(2).

It is noted that, while the examples of FIGS. 1A and 1B illustrate situations in which both network devices can potentially act as authenticators, many other situations are also possible. Such situations including those in which only one of the network devices can act as an authenticator and those in which neither of the network device can act as an authenticator.

According to some link authentication protocols, an interface (e.g., a port) begins operation in an unauthenticated state. While in the unauthenticated state, the interface can only send and receive communications (e.g., packets or frames) that are being sent according to the link authentication protocol (i.e., other communications are not allowed in this state). In the unauthenticated state, the interface uses the link authentication protocol to authenticate the peer interface to which the interface is coupled, acquire policy to be used to control communications sent to and/or received from the peer interface, and/or received via the link from the authentication server, and/or establish a security association between the interface and the peer interface. After the authentication completes, the interface operates in an authenticated state. When the interface is in the authenticated state, the network device can use the interface to send and receive communications.

In one embodiment, for a link authentication protocol exchange to be successful, the supplicant network device needs to be configured with an identity and a "secret" for use in the link authentication protocol exchange. The identity uniquely identifies the supplicant network device (and/or a particular interface within the network device) for purposes of link authentication. The secret is provided to the authentication server when the supplicant network device is being authenticated in order to verify the supplicant network device. In order for the authentication server to properly verify the supplicant, the identity and secret used by the supplicant also need to be configured on the authentication server.

Figure 2:
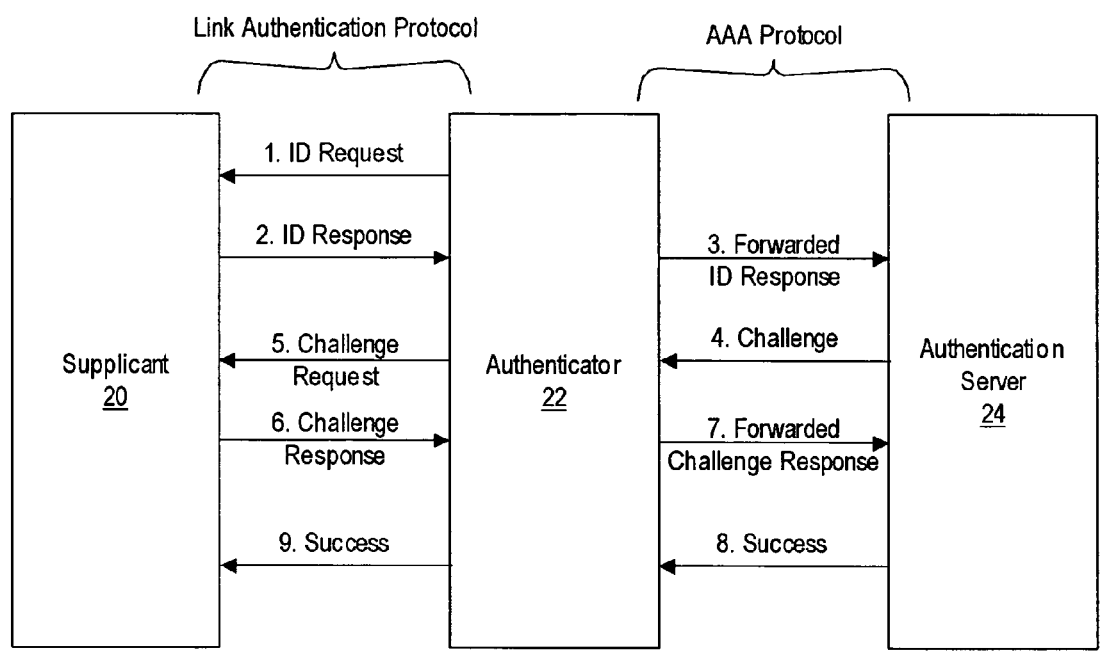
FIG. 2 illustrates a link authentication protocol exchange conducted using IEEE 802.1X as the link authentication protocol exchange.

FIG. 2 shows an example of a link authentication protocol exchange. In embodiments using IEEE 802.1X as the link authentication protocol, each link authentication protocol exchange involves several actions. First, authenticator 22 sends (1) a packet (referred to herein as an "ID Request") requesting identification information to supplicant 20. Authenticator 22 sends the ID Request in response to detecting that the link between authenticator 22 and supplicant 20 is active.

In response to the ID Request, supplicant 20 sends (2) a packet (referred to as an "ID Response") containing identification information to authenticator 22. The ID Response can include identification information configured on the supplicant for use with the link authentication protocol (e.g., such information can uniquely identify supplicant 20 and/or the interface of supplicant 20 coupled to authenticator 22 via the link being authenticated). Authenticator 22 then forwards (3) this information to authentication server 24. Authenticator 22 can communicate with authentication server 24 using an AAA (Authentication, Authorization, and Accounting) protocol such as RADIUS (Remote Authentication Dial-In User Service).

In response to receiving the information identifying supplicant 20 from authenticator 22, authentication server 24 sends (4) authenticator 22 a challenge (e.g., such as that used in a token password system) to be sent to supplicant 20. This challenge can, for example, include a request for the secret associated with the identity of supplicant 20. Authenticator 22 then sends (5) a link authentication protocol packet (referred to herein as "Challenge Request") that includes the challenge to supplicant 20.

Supplicant 20 sends (6) a response to the Challenge Request to authenticator 22 via another link authentication protocol packet (referred to herein as "Challenge Response"). This response can include the secret configured on the supplicant for use in the link authentication protocol. Authenticator 22 in turn forwards (7) the supplicant's response to authentication server 24. If the supplicant's response indicates that supplicant 20 has the appropriate credentials, authentication server 24 sends (8) a Success message to authenticator 22. Authenticator 22 uses the link authentication protocol to forward (9) the success message to supplicant 20. In response to each receiving a success message, supplicant 20 and authenticator 22 enable communication on the link via which the link authentication protocol exchange was conducted. Communication via the link can be restricted based on information contained in the success message received from authentication server 24.

Looking back at FIGS. 1A and 1B, one of network devices 12(1) and 12(2) will need to act as an authenticator in order to conduct the link authentication protocol exchange of link 16. The other network device will act as a supplicant. The network device that acts as the authenticator needs to have connectivity with an authentication server (e.g., authentication 12(3) in FIG. 1A or one of authentication servers 12(3) and 12(4) in FIG. 1B). As noted above, the roles of authenticator and supplicant, with respect to link 16, are initially indeterminate.

Network devices 12(1) and 12(2) dynamically determine which network device will be authenticator and which network device will be supplicant. Network devices 12(1) and 12(2) each initially assume both roles, and thus the network devices will initiate two link authentication protocol exchanges via link 16. In one of the link authentication protocol exchanges, network device 12(1) will act as authenticator and network device 12(2) will act as supplicant. In the other link authentication protocol exchange, network device 12(2) will assume the role of authenticator and network device 12(1) will assume the role of supplicant. In some situations, both exchanges are initiated at substantially the same time. For example, each network device 12(1) and 12(2), acting as an authenticator, can send a packet to the other network device before receiving any link authentication protocol packets from the other network device.

While two link authentication protocol exchanges are initiated via link 16, only one of the two link authentication protocol exchanges will complete (i.e., a success message will only be communicated in one of the two link authentication protocol exchanges). The other link authentication protocol exchange will be terminated on both network devices. Each of network devices 12(1) and 12(2) monitors both link authentication protocol exchanges and selects the exchange to terminate based on the results of the monitoring. Both network devices 12(1) and 12(2) will select the same exchange to terminate.

There are several outcomes that may arise during the two link authentication protocol exchanges. One outcome arises when one network device, acting in an authenticator role, successfully communicates with the authentication server and sends a Challenge Request to the peer network device, before the peer network device has received a Challenge message from the authentication server (in the other authentication protocol exchange where the peer network device is acting as authenticator). In this situation, the link authentication protocol exchange in which the peer network device is the authenticator will be terminated before completion, and the link authentication protocol exchange in which the peer network device is the supplicant will proceed to completion.

A second outcome arises when both network devices, acting in their respective authenticator roles, successfully communicate with the authentication server and send Challenge Requests to each other. In this situation, both network devices perform a tiebreaker function, based on information available to both network devices. As a result of the tiebreaker function, both network devices will select the same link authentication protocol exchange to terminate. For example, if the network devices exchange Media Access Control (MAC) addresses in link authentication protocol packets, the network devices can compare MAC addresses and choose the network device with the highest MAC address to be the authenticator. The link authentication protocol exchange in which the selected network device acts as a supplicant is terminated on both network devices.

Yet another outcome arises when neither network device is able to communicate with the authentication server. In this situation, neither link authentication protocol exchange will be able to complete, since neither network device can act as an authenticator. Accordingly, both link authentication protocol exchanges fail. If link authentication protocol is IEEE 802.1X, both network devices will continue to try to initiate link authentication protocol exchanges, and these exchanges will continue to fail and restart until either the network devices give up (e.g., based on the value of a timeout variable) or connectivity with the authentication server is restored.

Figure 3:
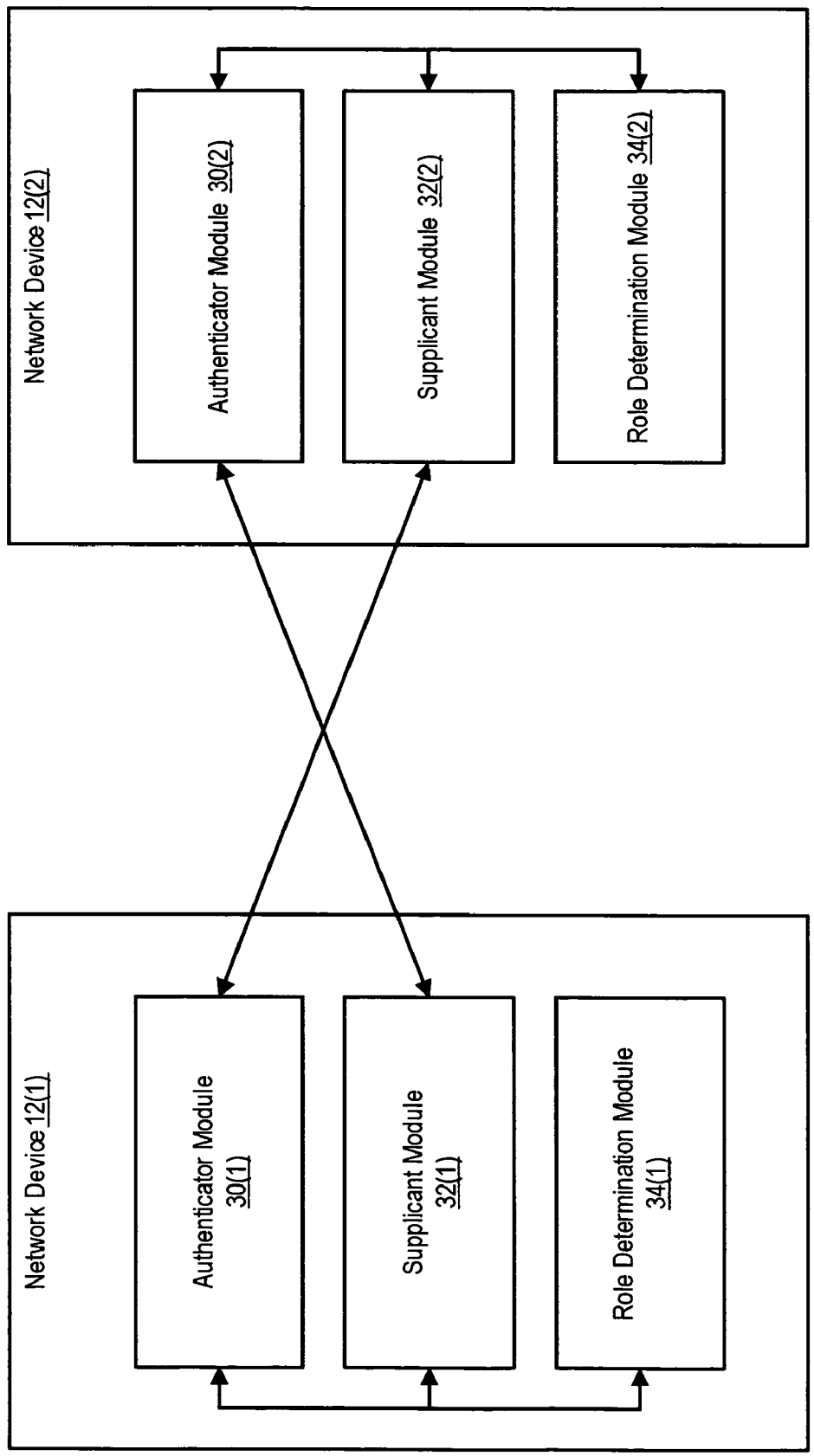
FIG. 3 is a block diagram illustrating link authentication protocol functionality within each network device, according to one embodiment of the present invention.

FIG. 3 shows how each network device can include a role determination module that monitors both an authenticator module and supplicant module. As shown, network device 12(1) (from FIG. 1) includes authenticator module 30(1), supplicant module 32(1), and role determination module 34(1). Similarly, network device 12(2) (also from FIG. 1) includes authenticator module 30(2), supplicant module 32(2), and role determination module 34(2). It is noted that network devices 12(1) and 12(2) may include a separate set of authenticator, supplicant, and role determination modules for each interface (e.g., if network device 12(1) has 16 interfaces, network device 12(1) may include three sets of authenticator, supplicant, and role determination modules).

Authenticator modules 30(1) and 30(2) are configured to operate as authenticators in a link authentication protocol exchange via a link. Thus, each authenticator module 30(1) and 30(2) is configured to detect whether the link is active. In response to detecting that the link is active, each authenticator module sends an ID Request (or other appropriate message, if a link authentication protocol other than IEEE 802.1X is being used) to the peer network device. Authenticator modules 30(1) and 30(2) are also configured to forward an ID Response and Challenge Response from a peer network device to an authentication server and to forward a Challenge Request and Success message received from the authentication server to the peer network device. In response to completing a successful link authentication protocol exchange (e.g., in response to receiving the Success message from the authentication server), each authenticator module 30(1) and 30(2) is configured to update the status of a respective interface coupled to the link from unauthenticated to authenticated.

It is noted that each authenticator module 30(1) and 30(2) operates independently of the authenticator module in the peer network device. Accordingly, the time at which authenticator module 30(1) detects that the link is active and sends an ID Request can differ from the time at which authenticator module 30(2) detects that the link is active and sends an ID request. Similarly, supplicant modules 32(1) and 32(2) operate independently of each other, as do role determination modules 34(1) and 34(2).

Supplicant modules 32(1) and 32(2) are configured to operate as supplicants in a link authentication protocol exchange. Supplicant modules 32(1) and 32(2) can each store identity and secret information associated with a respective network device and/or a respective interface. For example, an identity and secret can be assigned to a network device, and each supplicant module included within that network device can store the assigned identity and secret. Supplicant modules 32(1) and 32(2) are configured to send ID Responses and Challenge Responses to a peer network device in response to receiving corresponding ID Requests and Challenge Requests. Supplicant modules 32(1) and 32(2) are also configured to update the status of a respective interface coupled to the link from unauthenticated to authenticated in response to receiving a Success message.

Role determination modules 34(1) and 34(2) are configured to monitor activity in respective authenticator and supplicant modules and, based on that activity, select one of the two link authentication protocol exchanges for termination. Role determination module 34(1) monitors activity in authentication module 30(1) and supplicant module 32(1), while role determination module 34(2) monitors activity in authentication module 30(3) and 32(2). Role determination modules 34(1) and 34(2) use the same criteria to select which link authentication protocol exchange to terminate, such that both role determination modules will select the same link authentication protocol exchange for termination. Role determination modules 34(1) and 34(2) are configured to perform a tiebreaker function in situations in which both network devices 12(1) and 12(2) have connectivity with an authentication server.

Authentication module 30(1) can communicate with supplicant module 32(2) to conduct a link authentication protocol exchange via link 16 (not shown in FIG. 3). Similarly, authentication module 30(2) can communicate with supplicant module 32(1) to conduct another link authentication protocol exchange via link 16.

When the link coupling network device 12(1) to network device 12(2) becomes active, network device 12(1) will operate both supplicant module 32(1) and authenticator module 30(1). Role determination module 34(1) will monitor the activity taking place in both authenticator module 30(1) and supplicant module 32(1). In response to detecting that network device 12(1) has connectivity with an authentication server and also detecting that network device 12(2) has not yet established connectivity with an authentication server, role determination module 34(1) terminates the actions of supplicant module 32(1), effectively terminating the link authentication protocol exchange in which network device 12(1) acts as supplicant. Alternatively, in response to detecting that network device 12(1) does not yet have connectivity with an authentication server but that network device 12(2) does have connectivity with an authentication server, role determination module 34(1) can terminate the actions of authentication module 30(1), effectively terminating the link authentication protocol exchange in which network device 12(1) acts as authenticator. Role determination module 34(2) can similarly monitor authenticator module 30(2) and supplicant module 32(2) and terminate the action of one of these modules based on the monitored activity. Thus role determination modules 34(1) and 34(2) are each examples of a means for monitoring a plurality of link authentication protocol exchanges, a means for detecting whether the first network device has connectivity with an authentication server, as well as a means for terminating one of the link authentication protocol exchanges prior to completion of the one of the link authentication protocol exchanges.

Role determination module 34(1) can detect whether network device 12(1) has connectivity with an authentication server by monitoring activity in authentication module 30(1). For example, if authenticator module 30(1) has received a Challenge message from an authentication server, role determination module 34(1) can determine that network device 12(1) has connectivity with an authentication server. If authentication module 30(1) has not received a Challenge message from an authentication server, role determination module 30(1) determines that network device 12(1) does not yet have connectivity with an authentication server. Role determination module 34(2) can similarly detect whether network device 12(2) has connectivity with an authentication server by monitoring activity in authentication module 30(2).

Role determination module 34(1) can also determine whether network device 12(2) has connectivity with an authentication server in response to monitoring activity in supplicant module 32(1). For example, if supplicant module 32(1) has not yet received a Challenge request from network device 12(2), role determination module 34(1) can determine that network device 12(2) does not yet have connectivity with an authentication server. If supplicant module 32(1) has received a Challenge request from network device 12(2), role determination module 34(1) determines that network device 12(2) does have connectivity with an authentication server. In one embodiment, role determination 34(1) determines that network device 12(2) has connectivity with an authentication server if supplicant module 32(1) has received a request that is not an ID Request (i.e., a non-ID request) from network device 12(2). Role determination module 34(2) can similarly detect whether network device 12(1) has connectivity with an authentication server by monitoring activity in supplicant module 32(2). It is noted that by monitoring the authentication and supplicant modules, a role determination module is able to detect whether a network device has connectivity with an authentication server without the need to perform an additional server reachability test.

If role determination module 34(1) detects that network device 12(1) has connectivity with an authentication server and that network device 12(2) also has connectivity with an authentication server, role determination module 34(1) will perform a tiebreaker function in order to select one of the network devices 12(1) or 12(2) as the authenticator. If role determination module 34(1) selects network device 12(1) as the authenticator during the tiebreaker, role determination module 34(1) will terminate the operation of supplicant module 32(1). Otherwise, role determination module 34(1) will terminate the operation of authentication module 30(1). Likewise, if role determination module 34(2) selects network device 12(1) as the authenticator, role determination module 34(2) will terminate the operation of authenticator module 30(2). Otherwise, role determination module 34(2) will terminate the operation of supplicant module 32(2). Thus, role determination modules 34(1) and 34(2) are examples of means for detecting that both the first network device and a second network device have connectivity with the authentication server and means for performing a tiebreaker function.

In the above examples, since the role determination modules in both network devices are both monitoring activity caused by the same exchange of link authentication protocol packets and making determinations based on the same criteria, both network devices reach the same conclusion about the roles of each network device without needing to exchange additional messages. Additionally, since the non-terminated authentication protocol exchange is not affected, no additional delay is added into the authentication process. Furthermore, there is no need to randomly assign roles to each network device, only to have to restart the link authentication protocol exchange if the randomly-assigned roles are incorrect. There is also no need to restart the link authentication protocol exchange if a tie arises.

The above examples have described situations in which both network devices coupled by the unauthenticated link are configured to dynamically determine roles for the link authentication protocol exchange. It is noted that a network device that is configured to perform dynamic role determination can be coupled to a network device that does not perform dynamic role determination. For example, a network device that performs dynamic role determination can be coupled to a peer network device that has been preconfigured to have a certain role. In such situations, the network device that performs dynamic role determination will operate both an authenticator module and a supplicant module, as described above, while the peer network device will only operate as either an authenticator or a supplicant. If the peer network device is configured as a supplicant, the supplicant module in the network device will never receive an ID Request, and thus the operation of the supplicant module in the network device can eventually be terminated (e.g., due to timing out or due to the role determination module detecting that the authenticator module has connectivity with the authentication server). Similarly, if the peer network device is configured as an authenticator, the authenticator module in the network device will never receive an ID Response, and thus the operation authenticator module can eventually be terminated (e.g., due to timing out or due to the role determination module detecting that the peer network device has connectivity with the authentication server). Eventually, the only one of the authenticator or the supplicant module will remain in operation at the network device, allowing the peer network device to act according to its preconfigured role.

Figure 4:
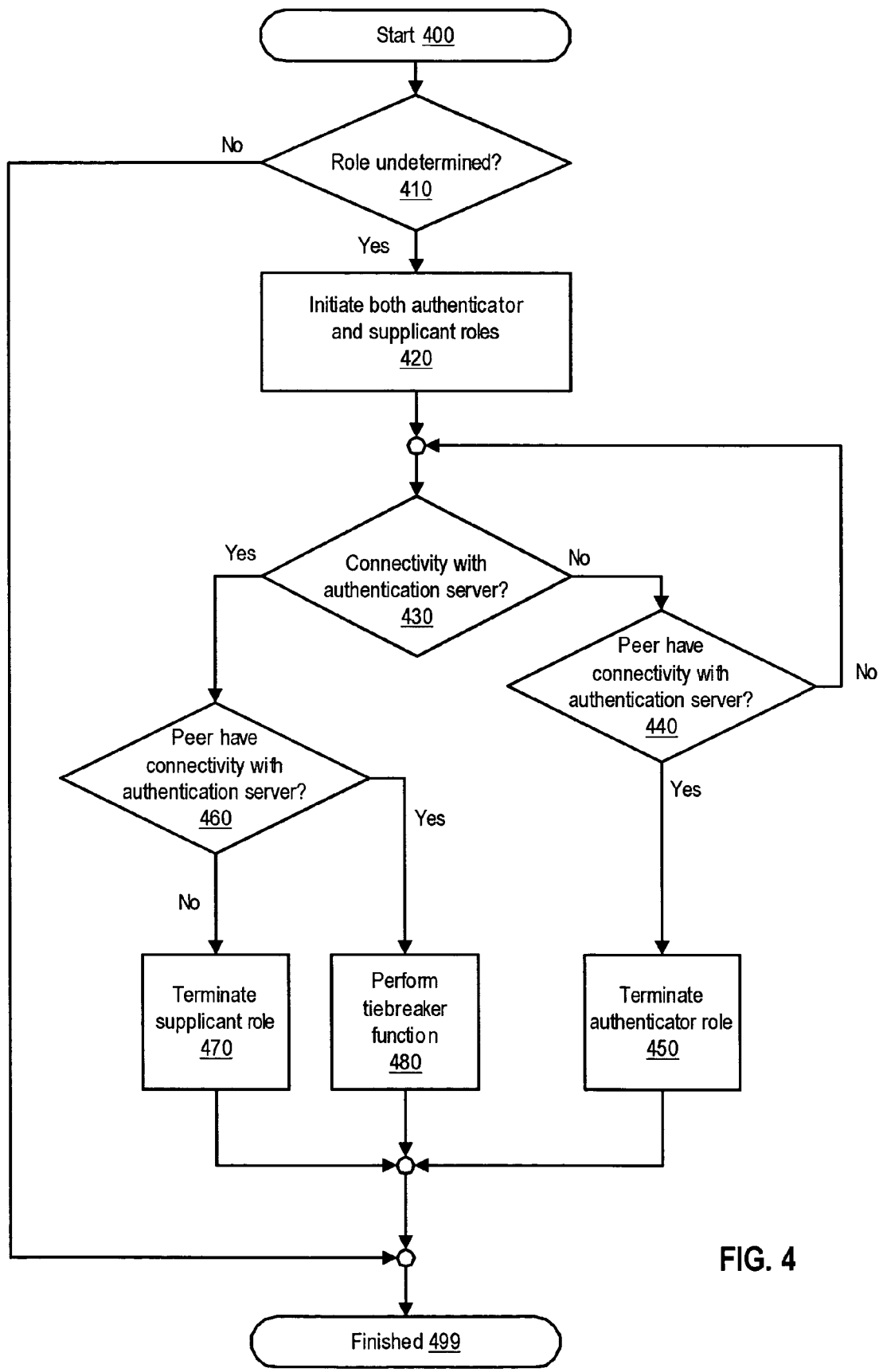
FIG. 4 is a flowchart of a method performed by a role determination module, according to one embodiment of the present invention.

FIG. 4 is a flowchart of a method performed by the role determination module. The method begins at 400. The role determination module is part of a network device and is configured to determine the proper role of the network device in a link authentication protocol exchange being conducted via a particular interface of the network device. If the role of the network device in the link authentication protocol exchange is undetermined (as detected at 410), the role determination module initiates both the authenticator and suppli-cant roles on the network device (e.g., by enabling both an authenticator module and a supplicant module), as shown at 420.

If the network device does not yet have connectivity with an authentication server, as detected at 430, and if the peer network device also does not yet have connectivity with an authentication server, as detected at 440, then the method continues to check for evidence that either the network device or the peer network device has connectivity. Eventually, the process may timeout (not shown) if neither device is able to establish connectivity with the authentication server.

Performance of function 430 can involve monitoring activity within the network device. For example, an authenticator module within the network device can be monitored to see if the network device has received a Challenge message from an authentication server and/or if the network device is prepared to forward such a Challenge message to the peer network device.

Performance of function 440 can likewise involve monitoring activity within the network device. For example, a supplicant module within the network device can be monitored to see if the supplicant module has a received a Challenge request from the peer network device.

If the network device does not yet have connectivity with the authentication server (determined at 430) and if the peer network device does have connectivity with the authentication server (determined at 440), then the authenticator role of the network device is terminated, as indicated at 450. It is noted that function 450 can be performed by terminating the operation of an authenticator module within the network device.

If the network device does have connectivity with the authentication server (determined at 430), and if the peer network device does not yet have connectivity with the authentication server (determined at 460), the supplicant role of the network device is terminated, as shown at 470. It is noted that function 470 can be performed by terminating the operation of a supplicant module within the network device. Furthermore, like function 440, function 460 can be performed by monitoring a supplicant module within the network device.

If the network device does have connectivity with the authenticator server (determined at 430), and if the peer network device also has connectivity with the authentication server (determined at 460), then a tiebreaker function is performed, as shown at 480. In response to the outcome of the tiebreaker, either the supplicant role or the authenticator role of the network device is terminated (not shown). The method ends at 499.

Figure 5:
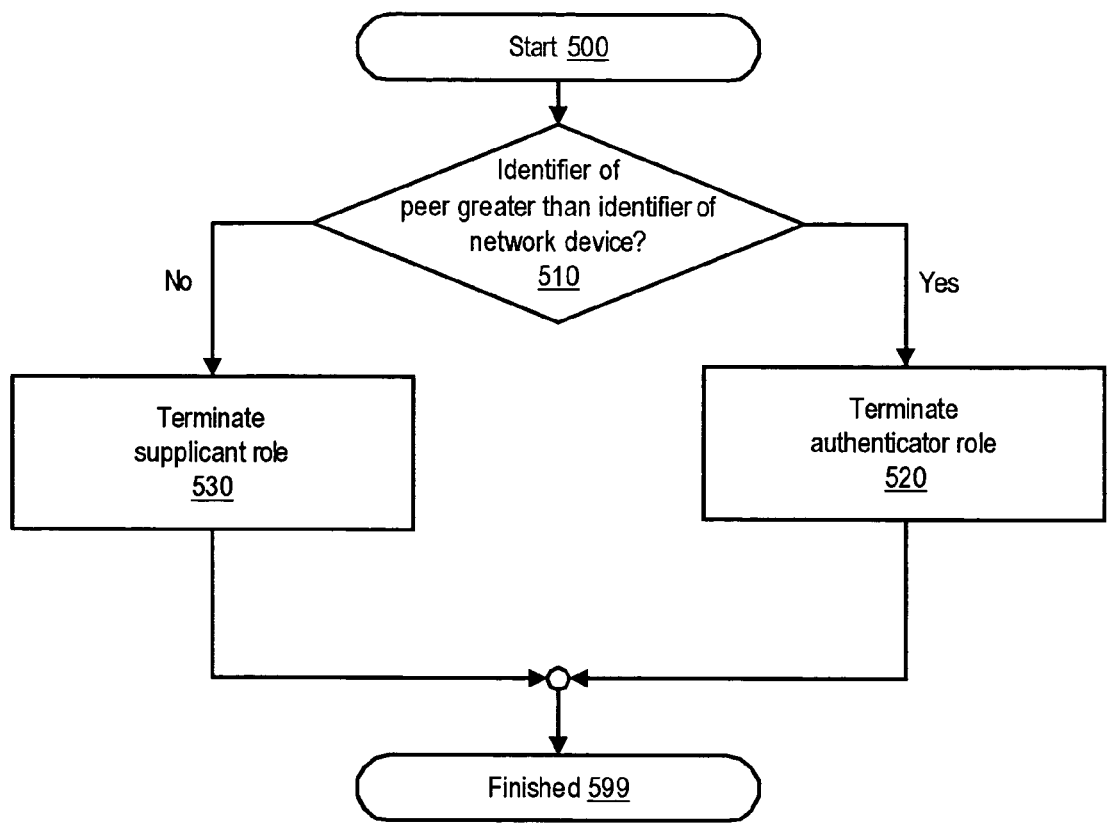
FIG. 5 is a flowchart showing an example of a method performed as a tiebreaker, according to one embodiment of the present invention.

FIG. 5 is a flowchart showing an example of a tiebreaker method, according to one embodiment of the present invention. It is noted that other techniques can be used to perform a tiebreaker in other embodiments, and such other techniques can use other information (e.g., instead of and/or in addition to MAC addresses) to determine the outcome of the tiebreaker. The method begins at 500.

In this example, the tiebreaker is performed by comparing identifiers (e.g., MAC addresses) used by the network device and the peer network device in link authentication protocol packets. More particularly, the network device having the larger identifier value will be selected as the authenticator. Thus, if the identifier of the peer network device is greater than the identifier of the network device, as determined at 510, then the authenticator role of the network device is terminated, as shown at 520. If instead the identifier of the peer network device is smaller than the identifier of the network device, then the supplicant role of the network device is terminated, as shown at 530. The method ends at 599.

Looking back at FIG. 3, it is noted that the program instructions executable to implement an authentication module, a supplicant module, and/or a role determination module can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like). In order to be executed, the software is loaded into memory from another computer storage readable medium. The instructions and/or data can also be transferred to a computing device for storage in memory via a network such as the Internet or upon a carrier medium. In some embodiments, a computer readable medium is a carrier medium such as a network and/or a wireless link upon which signals such as electrical, electromagnetic, or digital signals, on which the data and/or instructions implementing the authentication module, supplicant module, and/or role determination module are conveyed.

Although the present invention has been described with respect to specific embodiments thereof, various changes and modifications may be suggested to one skilled in the art. It is intended such changes and modifications fall within the scope of the appended claims.

What is claimed is:

1. A method comprising:
   monitoring a plurality of link authentication protocol exchanges initiated between a first network device and a second network device, wherein
      the first network device is an authenticator in a first one of the link authentication protocol exchanges and a supplicant in a second one of the link authentication protocol exchanges, wherein the first one of the link authentication protocol exchanges cannot complete unless the first network device has connectivity to an authentication server, wherein the link authentication protocol exchanges are extensible authentication protocol (EAP) exchanges, and wherein whether the first network device should be the authenticator or the supplicant is indeterminate, prior to initiation of the link authentication protocol exchanges;
   detecting whether the first network device has connectivity with the authentication server; and
   terminating one of the link authentication protocol exchanges prior to completion of the one of the link authentication protocol exchanges, wherein the terminating is performed in response to the detecting and wherein the monitoring, the detecting, and the terminating are performed by the first network device.

2. The method of claim 1, wherein the link authentication protocol exchanges are initiated at the same time.

3. The method of claim 1, wherein
   the terminating comprises terminating participation of the first network device in one of the link authentication protocol exchanges.

4. The method of claim 1, wherein the detecting comprises detecting receipt of a non-ID request from the second network device by the first network device.

5. The method of claim 1, wherein the detecting comprises detecting receipt of a message from the authentication server by the first network device.

6. The method of claim 1, further comprising
   detecting that both the first network device and the second network device have connectivity with the authentication server; and
   performing a tiebreaker function, in response to the detecting that both the first network device and the second network device have connectivity with the authentication sewer, wherein
   the terminating is also performed in response to the performing the tiebreaker function.

7. The method of claim 6, wherein
   the performing the tiebreaker function comprises comparing a first identifier of the first network device with a second identifier of the second network device.

8. The method of claim 1, wherein the link authentication protocol exchanges are IEEE 802.1X protocol exchanges.

9. The method of claim 1, further comprising:
   completing one of the link authentication protocol exchanges; and
   authenticating an interface that is coupled to a link coupling the first network device to the second network device in response to the completing.

10. A network device comprising:
a computer readable storage medium storing program instructions executable to implement plurality of modules, wherein the plurality of modules comprising:
an authenticator module for a link authentication protocol;
a supplicant module for the link authentication protocol; and
a role determination module coupled to the authenticator module and the supplicant module, wherein
the role determination module is executed to:
monitor the authenticator module and the supplicant module during a plurality of link authentication protocol exchanges initiated between the network device and a second network device, wherein the link authentication protocol exchanges are extensible authentication protocol (EAP) exchanges;
detect whether the network device has connectivity with an authentication server; and
terminate operation of one of the authenticator module and the supplicant module in response to detection of whether the network device has connectivity with the authentication server, prior to completion of a link authentication exchange, between the network device and the second network device, being participated in by the one of the authenticator module and the supplicant module, wherein the authenticator module cannot complete link authentication exchanges unless the network device has connectivity to the authentication server, and wherein whether the network device should be an authenticator or a supplicant is indeterminate, prior to initiation of the link authentication protocol exchanges.

11. The network device of claim 10, wherein
the role determination module is configured to detect receipt of a non-ID request by the supplicant module, and
the role determination module is configured to terminate operation of the authentication module in response to the non-ID request.

12. The network device of claim 10, wherein
the role determination module is configured to detect receipt of a message from the authentication server by the authentication module, and
the role determination module is configured to terminate operation of the supplicant module in response to the message.

13. The network device of claim 10, wherein the role determination module is configured to:
detect whether both the network device and the second network device have connectivity with the authentication server, and
perform a tiebreaker function in response to detection that both the network device and the second network device have connectivity with the authentication server, and
terminate operation of one of the authenticator module and the supplicant module in response to a result of the tiebreaker function.

14. A system comprising:
a plurality of network devices coupled by a plurality of links, wherein a first network device of the network devices comprises:
an authenticator module for a link authentication protocol;
a supplicant module for the link authentication protocol; and
a role determination module coupled to the authenticator module and the supplicant module, wherein the role determination module is configured to:
monitor the authenticator module and the supplicant module during a plurality of link authentication protocol exchanges initiated between the first network device and a second network device, wherein the link authentication protocol exchanges are extensible authentication protocol (EAP) exchanges,
detect whether the first network device or the second network device has connectivity with an authentication server, and
terminate, in response to detection of whether the first network device or the second network device has connectivity with the authentication server, operation of one of the authenticator module and the supplicant module, prior to completion of a link authentication exchange, between the first network device and the second network device, being participated in by the one of the authenticator module and the supplicant module, wherein the authenticator module cannot complete link authentication exchanges unless the first network device has connectivity to the authentication server, and wherein whether the first network device should be an authenticator or a supplicant is indeterminate, prior to initiation of the link authentication protocol exchanges.

15. The system of claim 14, wherein
a first link of the links couples the first network device to the second network device of the network devices.

16. The system of claim 15, wherein
the second network device comprises:
a second authenticator module for the link authentication protocol,
a second supplicant module for the link authentication protocol, and
a second role determination module coupled to the second authenticator module and to the second supplicant module.

17. The system of claim 14, wherein
the role determination module is configured to detect receipt of a non-ID request from the second network device by the supplicant module, and
the role determination module is configured to terminate operation of the authentication module in response to the non-ID request.

18. The system of claim 14, wherein
the role determination module is configured to detect receipt of a message from the authentication server by the authentication module, and
the role determination module is configured to terminate operation of the supplicant module in response to the message.

19. The system of claim 14, wherein
the role determination module is configured to:
detect whether both the first network device and the second network device have connectivity with the authentication server, and
perform a tiebreaker function in response to detection that both the first network device and the second network device have connectivity with the authentication server, and
terminate operation of one of the authenticator module and the supplicant module in response to a result of the tiebreaker function.

20. A computer readable storage medium storing program instructions executable to:
monitor a plurality of link authentication protocol exchanges initiated between a first network device and a second network device, wherein
a first network device is an authenticator in a first one of the link authentication protocol exchanges and a supplicant in a second one of the link authentication protocol exchanges, and wherein the first one of the link authentication protocol exchanges cannot complete unless the first network device has connectivity to an authentication server, wherein the link authentication protocol exchanges are extensible authentication protocol (EAP) exchanges, and wherein whether the first network device should be an authenticator or a supplicant is indeterminate, prior to initiation of the link authentication protocol exchanges;
detect whether the first network device has connectivity with the authentication server; and
terminate one of the link authentication protocol exchanges prior to completion of the one of the link authentication protocol exchanges, in response to detection of whether the first network device has connectivity with the authentication server.

21. The computer readable storage medium of claim 20, wherein the link authentication protocol exchanges are initiated at the same time.

22. The computer readable storage medium of claim 20, wherein
terminating the one of the link authentication protocol exchanges comprises terminating participation of the first network device in the one of the link authentication protocol exchanges.

23. The computer readable storage medium of claim 20, wherein
detecting whether the first network device has connectivity with the authentication server comprises detecting receipt of a non-ID request from the second network device by the first network device, and
terminating the one of the link authentication protocol exchanges comprises terminating the first one of the link authentication protocol exchanges.

24. The computer readable storage medium of claim 20, wherein
detecting whether the first network device has connectivity with the authentication server comprises detecting receipt of a message from the authentication server by the first network device, and
terminating the one of the link authentication protocol exchanges comprises terminating the second one of the link authentication protocol exchanges.

25. The computer readable storage medium of claim 20, wherein the program instructions are further executable to:
detect that both the first network device and a second network device have connectivity with the authentication server; and
perform a tiebreaker function, in response to detection that both the first network device and the second network device have connectivity with the authentication server, wherein the one of the link authentication protocol exchanges is terminated in response to the performing the tiebreaker function.

26. A system comprising:
means for monitoring a plurality of link authentication protocol exchanges initiated between a first network device and a second network device, wherein the first network device is an authenticator in a first one of the link authentication protocol exchanges and a supplicant in a second one of the link authentication protocol exchanges, and wherein the first one of the link authentication protocol exchanges cannot complete unless the first network device has connectivity to an authentication server, wherein the link authentication protocol exchanges are extensible authentication protocol (EAP) exchanges, and wherein whether the first network device should be an authenticator or a supplicant is indeterminate, prior to initiation of the link authentication protocol exchanges;
means for terminating one of the link authentication protocol exchanges prior to completion of the one of the link authentication protocol exchanges; and
means for detecting whether the first network device has connectivity with the authentication server, wherein the one of the link authentication protocol exchanges is terminated in response to the detecting.

27. The system of claim 26, wherein the link authentication protocol exchanges are initiated at the same time.

28. The system of claim 26, wherein
terminating the one of the link authentication protocol exchanges comprises terminating participation of the first network device in the one of the link authentication protocol exchanges.

29. The system of claim 26, wherein
detecting whether the first network device has connectivity with the authentication server comprises detecting receipt of a non-ID request from the second network device by the first network device, and
terminating the one of the link authentication protocol exchanges comprises terminating the first one of the link authentication protocol exchanges.

30. The system of claim 26, wherein
detecting whether the first network device has connectivity with the authentication server comprises detecting receipt of a message from the authentication server by the first network device, and
terminating the one of the link authentication protocol exchanges comprises terminating the second one of the link authentication protocol exchanges.

31. The system of claim 26, further comprising:
means for detecting that both the first network device and the second network device have connectivity with the authentication server; and
means for performing a tiebreaker function, in response to the detecting that both the first network device and the second network device have connectivity with the authentication server, wherein
the one of the link authentication protocol exchanges is terminated in response to the performing the tiebreaker function.

* * * * *

UNITED STATES PATENT AND TRADEMARK OFFICE
CERTIFICATE OF CORRECTION

| | | |
|---|---|---|
| PATENT NO. | : 7,657,744 B2 | Page 1 of 1 |
| APPLICATION NO. | : 10/915083 | |
| DATED | : February 2, 2010 | |
| INVENTOR(S) | : Wilson Kok | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1294 days.

Signed and Sealed this

Twenty-eighth Day of December, 2010

David J. Kappos
*Director of the United States Patent and Trademark Office*